W. W. HUMPHREY.
Curved Railway Rail.

No. 210,696.  Patented Dec. 10, 1878.

WITNESSES

F. A. Shute.
J. A. Boothby.

INVENTOR

William W. Humphrey
by his attorney
Geo. E. Pierson

UNITED STATES PATENT OFFICE.

WILLIAM W. HUMPHREY, OF BOSTON, MASSACHUSETTS.

IMPROVEMENT IN CURVED RAILWAY-RAILS.

Specification forming part of Letters Patent No. 210,696, dated December 10, 1878; application filed August 21, 1878.

*To all whom it may concern:*

Be it known that I, WILLIAM W. HUMPHREY, of Boston, in the county of Suffolk and Commonwealth of Massachusetts, have invented a new and useful Improvement in Railway-Rails for Curves, of which the following is a specification:

This invention is intended to obviate the binding effect of a car-wheel running on the inner or short curved rail of any railway. As the car turns to follow a curve to the right or left the wheel on the inner or short curve will slide or drag, thus requiring an increase of power to draw the car around the curve. For this reason, on street-railways an extra horse generally has to be used at the curves, and more especially on an uphill curve. This dragging or binding effect of the car-wheel tends to wear the wheels, the journals of the axle, the rails, and to rack the car.

It is estimated that the wear of cars and wheels, &c., is as much in going around one of the curves in ordinary use on street or steam railways as in passing over many miles of good straight track.

The object of my invention is to provide a sufficient number of balls to be placed in the tread of the rail, said balls to be made of steel or other suitable metal.

Apertures or grooves may be made in the tread of the rail, the top portion of the balls projecting through said apertures. To effect this the rail may be made in two parts—a bottom and a top part—and fastened together securely by bolts or otherwise. Said apertures should be made just large enough to allow the top portion of the balls to project through and fill the space or aperture in the tread of the rail.

Figure 1:
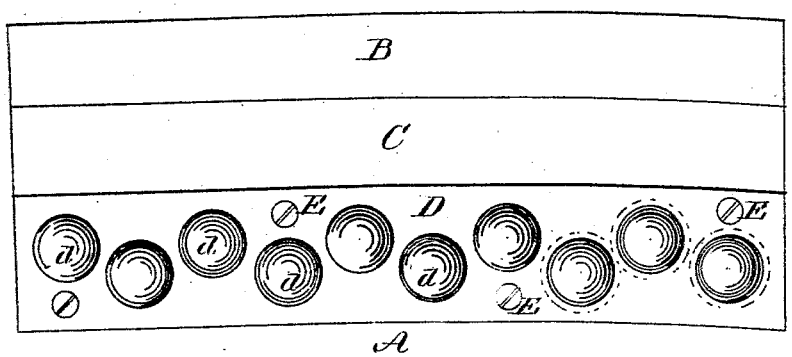
Figure 2:
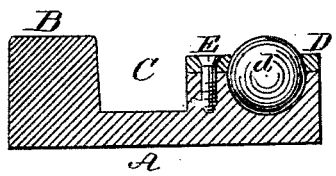
Figure 3:
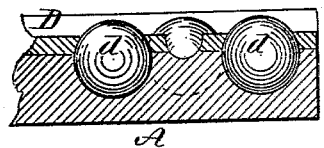

In the accompanying drawings, in which similar letters of reference indicate like parts, Figure 1 is a plan view of the device embodying my invention. Fig. 2 is a vertical cross-section of the same. Fig. 3 is a longitudinal vertical section of the same.

B represents the flange of the rail used for street-railways, which is made higher than the tread of the rail for curves. C is the groove, in which the flange of the car-wheel runs. D is the tread of the rail. d d are the balls inserted in the tread of the rail.

An aperture or groove is made in the tread of the rail of the requisite depth, so that the balls will just project above the top of the tread, said balls resting in the bottom of the aperture.

The operation of my device is as follows: The flange of the car-wheel running in the groove C of the street-rail, or by the side of the rail on a steam-railway, the tread of the wheel will run on the balls inserted in the tread of the rail, which, turning or revolving, will relieve the binding of the wheel, which takes place in passing over the flat surface of the tread of the common curved rail, and the binding of the flange of the wheel on the flange of the short-curve rail.

In my Patent No. 202,945, dated April 30, 1878, improvement in curved street-rails, I have been allowed for rollers or wheels inserted in the tread of the rail to relieve the binding of the wheel which takes place in passing over the flat surface of the tread of the common curved rail; but these rollers or wheels, having only a longitudinal movement, or movement in the direction of the length of the curve, will not allow of the lateral movement of the car and wheels requisite to relieve the friction and grinding of the flange of the wheel running on the short-curve rail against the flange of the rail. This binding of the flange of the wheel against the flange of the rail also causes much resistance and friction, preventing the easy rolling of the wheels around the curves.

By my present improvement, placing balls in the tread of the rail instead of rollers or wheels, as described in my patent of April 30, 1878, a lateral motion is allowed away from the short-curve rail toward the opposite rail, thus relieving the binding of the wheel on the flat surface of the tread of the rail, and also the binding of the flange of the wheel on the short-curve rail against the flange of the short-curve rail.

On railways operated by steam there is no such flange as is used on street-rails for curves, but sometimes a guard-rail in place of it; but, the tread of the car-wheel rolling upon the balls inserted in the tread of the rail, as described, the same result will be produced.

I do not claim as my invention the form of the curved rail now used on street or steam railways.

What I do claim is—

A curved rail for steam or horse cars, with balls inserted in the tread of the rail, as described, and for the purpose set forth.

WILLIAM W. HUMPHREY.

Witnesses:
GEO. E. BETTON,
F. A. SHUTE.